May 11, 1948.   W. M. LEHMAN ET AL   2,441,159
PORTABLE PROJECTION APPARATUS
Filed Aug. 27, 1945   3 Sheets-Sheet 2
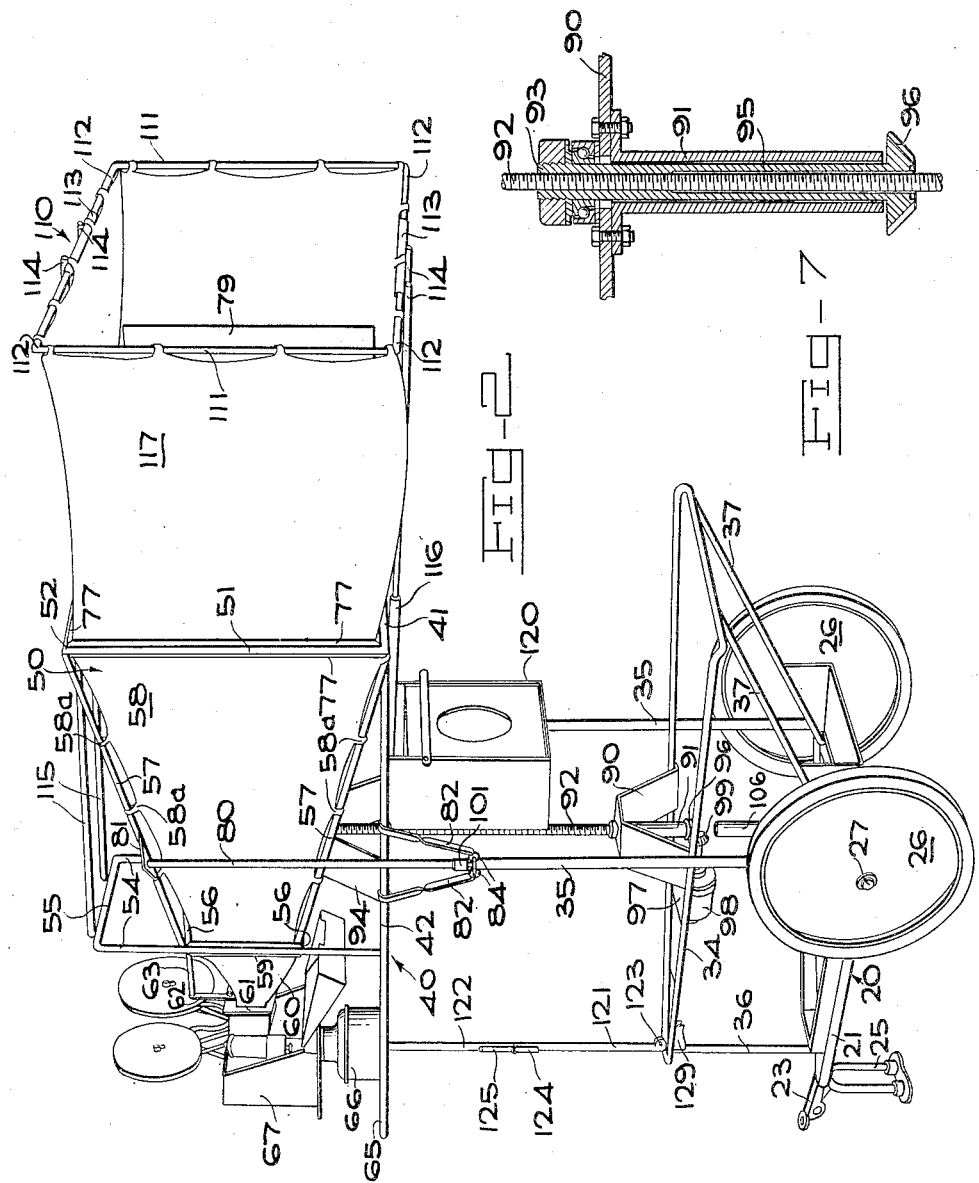
INVENTOR.
Wendell M. Lehman
Wilbur C. Rachels
BY
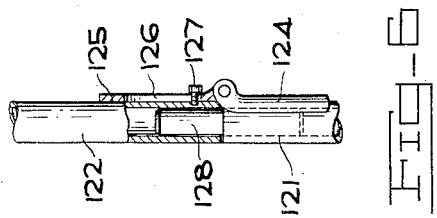
ATTORNEYS May 11, 1948. W. M. LEHMAN ET AL 2,441,159
PORTABLE PROJECTION APPARATUS
Filed Aug. 27, 1945 3 Sheets-Sheet 3
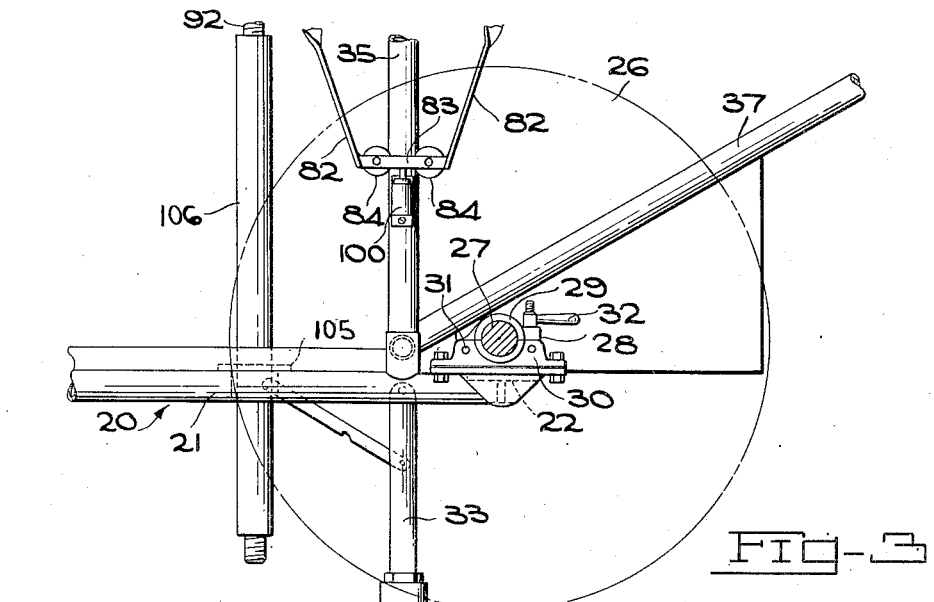
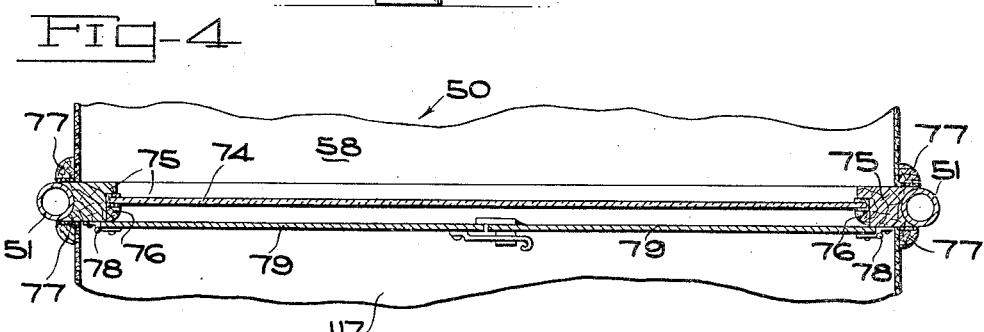
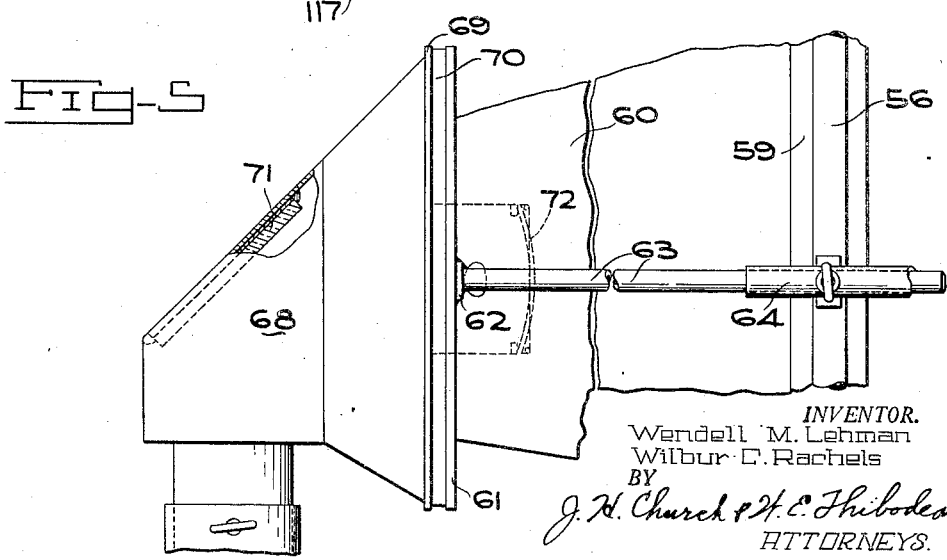
INVENTOR.
Wendell M. Lehman
Wilbur C. Rachels
BY
J. H. Church & H. C. Thibodeau
ATTORNEYS.

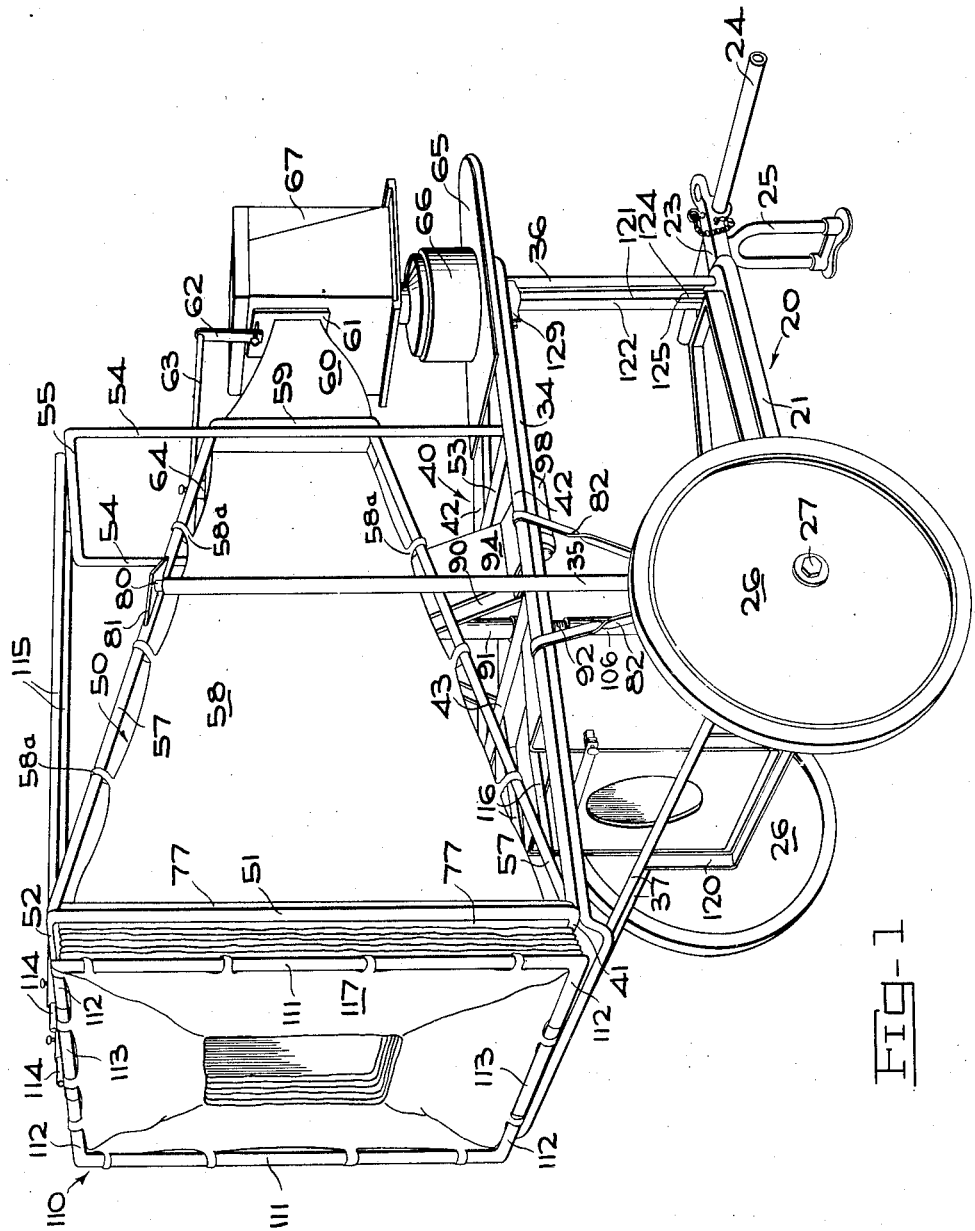

Patented May 11, 1948

2,441,159

UNITED STATES PATENT OFFICE 2,441,159

PORTABLE PROJECTION APPARATUS

Wendell M. Lehman, Davenport, Iowa, and Wilbur C. Rachels, Rock Island, Ill.

Application August 27, 1945, Serial No. 612,902

9 Claims. (Cl. 88—24)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to apparatus for use with a projector for the showing of motion pictures or the like and more particularly to an improved apparatus of the type referred to that is portable so that it may be readily transported from one location to another.

The invention contemplates and has for its principal object the provision of a portable apparatus including a wheeled base unit which carries a projection or display unit for use in the showing of motion pictures or the like in comparatively widely separated localities where the circumstances are such that it would be impractical to assemble a large audience for a single showing. Circumstances of the type referred to occur generally in instances where a large number of individuals constitute a collective group but are segregated into various departments and sections. These instances occur frequently in business and manufacturing organizations and in educational institutions and, although it is desirable to provide for the display of educational matter by way of motion pictures or the like, it is not always possible or desirable to gather the entire group of employees or students together for a single showing of the film. It has been found more efficient to exhibit the film to small groups and preferably at or near their normal places of occupation. According to the present invention a suitable apparatus has been provided for this purpose, which is completely portable and which may be easily transported from one locality to another and through corridors and on elevators of buildings.

It is an important object of the invention to provide the apparatus with a projection hood structure that is collapsible and extendible both longitudinally and laterally so that the apparatus may be reduced in size for transport and extended in size for use in the display or projection of film or the like.

It is another important object of the invention to provide this hood structure with a translucent screen and to provide a motion picture projector or the like for projecting images onto the rear face of the screen so that these images may be observed by the audience viewing the front face of the screen.

It is another object of the invention to arrange the projector and the screen in the manner stated above and to provide means for correcting the projected image so that it may be correctly observed by the audience.

Still another object of the invention is to provide an apparatus of the type referred to which includes a transportable base unit including means for raising and lowering an upper unit so that the projection means on the upper unit may be disposed at a height providing for the convenient showing of the pictures or other matter.

It is still another object of the invention to provide a portable unit in which the wheels may be removed from at least total weight-carrying position so that the base may be rigidly supported in position.

And another object of the invention is to provide projection apparatus that may be simply and inexpensively constructed and that may be easily operated by the adaptation thereto of conventional motion picture and recording units or the like.

A further understanding of the foregoing and other desirable objects and features of the invention may be had from the following detailed description of a preferred embodiment of the invention as illustrated in the accompanying sheets of drawings in which:

Fig. 1 is a perspective view of the apparatus in transport position;

Fig. 2 is a perspective view of the apparatus with the upper unit elevated and the hood structures extended for the showing of motion pictures;

Fig. 3 is an enlarged fragmentary view, partly in section, showing the details of the frame structure and axle mounting;

Fig. 4 is an enlarged transverse sectional view showing the mounting of the projection screen;

Fig. 5 is an enlarged fragmentary plan view showing the relationship between the motion picture projector and the means for reversing the image projected to the screen;

Fig. 6 is an enlarged fragmentary detail view of the auxiliary supporting means for the upper unit; and Fig. 7 is an enlarged sectional view showing the construction of the drive means for elevating the upper unit.

The preferred form of apparatus for the purpose of illustration includes a base unit, generally indicated by the numeral 20, comprising a generally longitudinal, horizontal lower frame structure 21 having a transverse frame member 22 (Fig. 3) and a pair of rearwardly converging side members that terminate in a draft tongue 23 having at its end means for the detachable mounting of a crossbar 24. This bar serves as a convenient means for transporting the apparatus, as will be hereinafter more clearly set forth. The rearward portion of the frame 21 includes supporting structure in the form of a pair of vertical members 25 which serve to maintain the frame 21 in its generally horizontal position when the apparatus is at rest. The forward end of the frame 21 is provided with a pair of rolling ground supports in the form of wheels 26 carried by the transverse frame member 22. Each wheel includes a stub axle 27 supported in a bearing 28 having upper and lower halves 29 and 30. The upper bearing half is pivoted at one side, as at 31, to the lower half and is detachably secured at its other side by securing means 32 preferably in the form of a swinging bolt and nut (Fig. 3). The nut may be loosened and the eyebolt swung away from the bearing half 29 so that the latter may be pivoted about the point 31 to permit removal of the stub axle 27 and wheel 26. It will be understood of course that any suitable means may be provided for the mounting of the wheels 26 and it is contemplated that such means may appropriately provide for the partial retraction of the wheels 26 from at least total weight-carrying position. When the wheels 26 are removed the front end of the frame may be supported on jack elements 33, or may be otherwise suitably supported. The jack elements may of course be swung upwardly toward the frame 21 when the unit is transported.

The base unit 20 includes an upper frame element 34 generally paralleling the lower frame element 21 and rigidly supported by said lower frame by means of a pair of vertically extending guide elements in the form of tubular members 35 which extend upwardly from the frame 21 from points respectively, at the junctions of the side members with the cross members 22 (Fig. 3). The rear portion of the frame 34 is rigidly supported by means of an upright support 36 extending between the two frame elements. It will be noted (Fig. 1) that the tubular members 35 extend a considerable distance above the frame element 34 while the upper end of the supporting member 36 terminates substantially at the rear portion of the frame 34. The relationship between these elements and cooperating structure will be set forth below. The front portion of the frame 34 is extended forwardly and braced by frame members 37 to provide additional means for maneuvering the unit when it is set up.

The base unit 20 is adapted to carry thereon an upper unit, indicated generally by the numeral 40. The unit includes a longitudinally extending horizontal frame formed generally as a triangle and including a front transverse member 41 and a pair of rearwardly converging side members 42. The members 42 are preferably formed from one piece of tubing, bent in the form of a V, and suitably braced by a transverse cross member 43.

The upper unit carries and is combined with a first hood structure, indicated generally by the numeral 50, which is formed at its forward end by a pair of transversely spaced vertical members 51 connected at their lower ends to the transverse frame member 41 of the upper unit 40 and cross-connected at their upper ends by a transverse frame member 52. The frame members 41, 51, and 52 thus form a square open frame.

A portion of the upper unit 40 intermediate its ends is provided with a transverse frame member 53 and a pair of transversely spaced upwardly extending frame members 54 are secured at their lower ends to the upper unit 40 substantially at the junctions of the transverse frame member 53 and the longitudinal frame members 42. An upper transverse frame member 55 cross-connects the upper ends of the vertical frame members 54. It will be noted that the structure provided by the frame members 53, 54, and 55 is in the form of a rectangle elongated vertically with respect to the unit 40. A pair of transverse, vertically spaced frame members 56 are cross-connected between the vertical members 54 intermediate their ends to provide a square open frame, and a plurality of forwardly diverging frame members 57 are connected between the open frame formed by the members 56 and 54 and the open frame provided by the members 41, 51, and 52 in such a manner as to provide a structure in the form of a truncated pyramid having the latter mentioned open frame as its base. The pyramidal structure thus provided includes a hood 58 of any suitable material forming an enclosure within the structure thus described but leaving the opposite ends of the pyramid open. The hood 58 includes a plurality of detachable connecting means such as loops 58a spaced along its four sides. The ends of the hood 58 are supported in a light-tight manner respectively in the end frames 55—56 and 41—51—52, as will be hereinafter more clearly set forth. The smaller end of the pyramidal structure is fitted with a secondary square frame 59 forming part of an auxiliary hood means 60. This hood means serves as an adjustable extension of the hood 58 and includes at its rear end a rectangular frame 61 having a vertical extension member 62 to which is rigidly connected one end of a longitudinally extending support 63. A bearing 64 is rigidly carried by the upper of the transverse members 56 and serves to carry the support 63 for longitudinal sliding movement so that the frame 61 may be adjusted longitudinally with respect to the adjacent frame 59.

The converging rear end of the upper unit 40 formed by the bending of the longitudinal frame members 42 is provided with a transverse platform 65 which in turn carries supporting means 66 for the supporting of a projector of motion pictures or the like as indicated generally by the numeral 67. The supporting platform 65 may be provided with suitable means by which the projector 67 may be secured to the platform in different positions of longitudinal adjustment. The projector 67 is preferably arranged on the supporting means 66 with the axis of its lens transverse to the longitudinal axis of the upper unit 40. The interior of the projector is fitted with means for reversing the image projected by the projector through the opening in the frame 61 on the auxiliary hood structure 60. In the present instance, the means for accomplishing the purpose set forth takes the form of a box-like structure 68 having its edge flanged as at 69 to form a rectangle that cooperates with the rectangular frame 61. The latter is preferably formed with a suitable gasket 70 for the purpose of providing a light-tight seal between the elements 61 and 69. A reflecting means in the form of a mirror 71 is arranged in the box-like unit 68 and is disposed at an angle of 45° to the normal line of projection. This medium provides for the reversal of the image aforesaid and for projection thereof through a secondary lens 72 carried in the rectangular frame 61.

The larger end of the pyramidal structure previously referred to (formed by the members 41, 51, and 52) is fitted with a translucent screen 74 having its rear face arranged within the enclosure provided by the hood 58 and having its front or outer face exposed to the view of the audience. A secondary frame 75, preferably formed of wood and including interior molding strips 76, in which the screen 74 is carried, and exterior molding strips 77, is fitted into the frame provided by the members 41, 51, and 52 with the molding 77 at opposite sides of said frame. The front portions of the hood material 50 are tacked or otherwise secured to the strips 77. The opposite vertical side members of this wooden frame 75 each carry hinges 78 for a pair of swingable doors 79. When the unit is transported, the doors 79 may be closed and locked and thus serve as means providing protection for the screen 74. The screen is preferably in the form of a plate of ground glass, although it may be made of any other suitable material.

As previously stated, the upper unit 40 is mounted on the base unit 20 for vertical movement between raised and lowered positions. The lowered position is that occupied when the unit is transported, and the raised position is utilized to dispose the hood structure 58 at a convenient height for the showing of motion pictures or the like. The upper unit 40 carries on each side thereof a depending guide member 80 secured at its upper end by means of bracket structure 81 to the upper frame member 57 of the pyramidal structure. The members 80 are respectively slidably engageable with the vertical tubular members 35 on the base unit 20. The upper unit 40 is further braced with respect to the vertical members 35 by means of bracing structures at each side thereof. As shown particularly in Figs. 1 and 3 each bracing structure takes the form of a pair of depending frame members 82 respectively secured as by welding at their upper ends to the longitudinal frame member 42 of the unit 40 and cross-connected at their lower ends by a bar 83. This bar carries a pair of rollers 84, one at each side of and engaging the tubular member 35.

The upper frame structure 34 of the base unit 20 carries a transverse supporting element 90 on which is secured a housing 91. A vertical threaded shaft 92 is threaded into a threaded sleeve 93 rotatably carried in the housing 91 and is journaled at its upper end in a suitable bearing carried in a transverse supporting element 94 rigidly cross-connected between the longitudinal frame members 42 of the upper unit 40. The sleeve 93 includes an integral extension 95 that extends vertically through the housing 91 and has at its lower end a bevel pinion 96. A transverse plate 97 is rigidly connected to the opposite sides of the frame structure 34 and carries thereon means, preferably in the form of an electric motor 98, having a driving shaft including a bevel pinion 99 meshing with the bevel pinion 96 on the sleeve of the collar 93. The electric motor has been found to be suitably adapted for use as power means for raising and lowering the upper unit 40, although it will be understood that any equivalent means may be used. When the electric motor 98 is used it is desirable to provide means for automatically cutting out the motor when the upper unit 40 reaches the limits of its upward and downward travel. These means preferably take the form of a lower limit switch 100 (Fig. 3) and an upper limit switch 101 (Fig. 2) which cooperate with the crossbar 83 of one of the auxiliary bracing means between the upper unit 40 and the vertical tubular members 35. The lower frame 21 of the base unit 20 is provided with a transverse member 105 which supports a vertical tube section 106. This tube receives and serves as a housing for the threaded shaft 92 when the the apparatus is in transport position.

The upper unit 40 and hood structure 59 thereon are adapted to support a second hood structure which is preferably extendible and collapsible both longitudinally and laterally with respect to the screen 74. In the preferred form of invention illustrated, the forward portion of the second hood structure is formed as a generally rectangular, laterally adjustable frame indicated generally by the numeral 110. This frame comprises a pair of opposite side frame members 111 each of which has at its upper and lower ends an inwardly directed frame member 112. The members or extensions 112 are telescopically interconnected, preferably by means of short transverse tubular members 113. Each transverse member 113 has extending rearwardly therefrom a pair of parallel, longitudinal frame members 114. A pair of parallel longitudinal supporting members preferably in the form of tubular members 115 are rigidly connected at their forward and rearward ends respectively to the transverse frame members 52 and 55 and are adapted to receive telescopically the upper pair of longitudinally extending frame members 114. Similar tubular members 116 are connected respectively at their front and rear ends to the transverse frame member 41 and the transverse frame member 43 of the upper unit 40, and these members telescopically receive the lower pair of longitudinally extending members 114. A flexible enclosure means in the form of a hood 117 is connected at one end to the first hood structure preferably by means of tacking to the strips 77 of the secondary frame 76 and is suitably connected at its other end to the frame provided by the members 111, 112, 113, and 114.

As stated above, one of the principal objects of the invention is to adapt the apparatus for use with conventional projection and sound units. It has been previously pointed out that the supporting means 66 is readily attachable for the supporting of any type projector of motion pictures or the like. Likewise the upper unit 40 is provided with a suitable support, such as that indicated by the numeral 120, for carrying a speaker or similar instrument connected in any suitable manner to the sound track of the projector 67.

Another feature of the present invention is the provision of means forming an auxiliary support for the upper unit when it is in its raised position. This means preferably takes the form of a pair of flexibly inter-connected members 121 and 122. The member 121 is provided at its lower end with a hinged connection 123 to the vertical member 36 at the rear end of the base unit 20. The upper end of the member 121 includes the lower half 124 of a hinge and the upper half 125 of the hinge is provided with a vertically extending slot 126 through which is passed a stud 127 threaded into or otherwise secured to the lower end of the upper member 122. The member 122 is preferably tubular at least at its lower end, and, when connected to the member 121 in supporting position, receives a pin 128 formed as an axial extension of the member 121. The member 122 is disconnected from the member 121 by means of upward movement thereof so that it is freed from the pin 128, this movement being permitted by means of the slot and stud connection 126—127. Since the lower end of the member 121 is hinged at 123 on the upright 125, the two members may be conveniently folded about the pivot of the hinge 124—125 into a retracted position forwardly of and paralleling the upright member 36. Suitable holding means in the form of a clip 129 is carried by the upright member 36 and receives the folded or collapsed members 121 and 122. When the upper unit 40 is in raised position the members 121 and 122 are extended and are securely locked together by means of engagement of the pin 128 with the lower end of the member 122 and the upper end of the member 122 engages the under side of the platform 65.

When the apparatus constructed according to the present invention is arranged for transport, the open frame provided on the second hood structure by the frame members 111—114 is telescoped together and reduced to its minimum size and the frame as a whole is telescoped rearwardly toward the screen 74 after the doors 79 have been closed and locked over the screen. The motor 98 is operated to lower the upper unit 40 to its lower position so that the elements of the apparatus occupy a relatively much smaller space. It has been found that the arrangement enables easy transport of the apparatus through the halls and on the elevators of most ordinary buildings.

When it is desired to operate the unit, the motor 98 is used to drive the upper unit 40 to its uppermost position, the upper limit switch 101 serving to disconnect the motor when this position of the upper unit is reached. The second hood structure is at this time extended longitudinally away from the screen 74 by means of the telescopic connections between the longitudinal members 114, 115 and 116. The opening provided by the members 111 and 114 is then enlarged by movement of the side members 111 outwardly and there is thus provided a comparatively enlarged rectangular opening through which the screen 74 may be viewed. When the doors 79 are opened they lie flat against the sides of the hood 117.

As previously stated, the supporting means 66 for the projector 67 on the upper unit 40 is adjustable longitudinally of the unit. In the event that it is necessary to make such adjustment, a corresponding adjustment may be made in the position of the hood 60 and rectangular frame 61 by means of the adjustable support 63 that is carried in the bearing 64 on the cross member 56.

It will be noted that the apparatus herein disclosed and illustrated is simply and inexpensively fabricated from structural tubular members. It will be understood of course that any suitable equivalent frame structure may be employed. Various other modifications and alterations in the preferred form of the invention may likewise be made without departing from the spirit and scope of the invention as defined in the appended claims.

We claim:

1. Portable apparatus for use with a projector for the showing of motion pictures or the like, comprising a base unit having a generally longitudinal, horizontal lower frame, rolling ground supports for said base unit, a generally longitudinal, horizontal upper frame rigidly supported by and above said lower frame, a pair of upright tubular guide members rigidly connected to said upper and lower frames, one at each side thereof, an upper unit including a generally longitudinal, horizontal main frame, means including a pair of vertical members rigidly connected respectively at opposite sides of said main frame and cooperating with the aforesaid tubular members for arranging said upper unit for vertical movement with respect to said base unit, brace means carried by said upper unit main frame and including roller means in supporting relation with said tubular members, means cooperable between said units for raising and lowering said upper unit, a foldable supporting element connected to one unit and extensible to engage the other unit to provide additional support for said upper unit when raised, a first hood section formed as a boxlike enclosure disposed longitudinally of and carried by said upper unit main frame and including at one end thereof a generally upright translucent screen and at the other end thereof an open frame, means on said upper unit main frame for supporting a motion picture projector or the like adjacent said open frame for the projection of images to the inner face of said screen, a second hood section including a second open frame at the outer face of said screen having laterally adjustable frame members providing for enlargement or reduction of said second open frame, means including telescopic connections between said second open frame and said first hood section for mounting said second open frame for movement longitudinally toward and away from said screen, and means included in said second hood section forming a flexible, boxlike enclosure between said screen and said second open frame.

2. Portable apparatus for use with a projector for the showing of motion pictures or the like, comprising a base unit having a generally longitudinal, horizontal frame, rolling ground supports for said base unit, means mounting said supports on said frame for normally carrying said base unit in transport and for removal from at least total weight-carrying position, a pair of upright guide members rigidly connected to said frame, one at each side thereof, an upper unit including a generally longitudinal, horizontal main frame, means including a pair of vertical members rigidly connected respectively at opposite sides of said main frame and cooperating with the aforesaid guide members for arranging said upper unit for vertical movement with respect to said base unit, means cooperable between said units for raising and lowering said upper unit, a collapsible supporting element connected to one unit and positionable to engage the other unit to provide additional support for said upper unit when raised, a first hood section formed as a boxlike enclosure disposed longitudinally of and carried by said upper unit frame and including at one end thereof a generally upright translucent screen and at the other end thereof an open frame, means on said upper unit main frame for supporting a projector of motion pictures or the like adjacent said open frame for the projection of images to the inner face of said screen, a second hood section including a second open frame at the outer face of said screen having adjustable frame members providing for enlargement or reduction of said second open frame, means including extensible and retractable elements between said second open frame and said first hood section for mounting said second open frame for movement longitudinally toward and away from said screen, and means included in said second hood section forming a flexible, boxlike enclosure between said screen and said second open frame.

3. Portable apparatus for use with a projector for the showing of motion pictures or the like comprising a base unit having a frame, rolling ground supports on said frame for carrying said unit in transport, upright guide structure rigidly connected to said frame, an upper unit including a frame, means including depending guide structure rigidly connected to said upper unit frame and cooperating with the aforesaid guide structure for arranging said upper unit for vertical movement with respect to said base unit, means cooperable between said units for raising and lowering said upper unit, a first hood section formed as a boxlike enclosure disposed longitudinally of and carried by said upper unit main frame and including at one end thereof a generally upright translucent screen and at the other end thereof an open frame, means on said upper unit main frame for supporting a projector of motion pictures or the like adjacent said open frame for the projection of images to the inner face of said screen, a second hood section including means at the outer face of said screen providing a second open frame, means including collapsible connecting elements between said second open frame and said first hood section for mounting said second open frame for movement toward and away from said screen, and means included in said second hood section forming a flexible, boxlike enclosure between said screen and said second open frame.

4. Portable apparatus for use with a projector for the showing of motion pictures or the like, comprising a base unit having a generally longitudinal, horizontal lower frame, rolling ground supports for said base unit, means mounting said supports on said lower frame for normally carrying said unit in transport and for removal from at least total weight-carrying position, a generally longitudinal, horizontal upper frame rigidly supported by and above said lower frame, a pair of upright tubular guide members rigidly connected to said upper and lower frames, one at each side thereof, an upper unit including a generally longitudinal, horizontal main frame, means including a pair of vertical members rigidly connected respectively at opposite sides of said main frame and cooperating with the aforesaid tubular members for arranging said upper unit for vertical movement with respect to said base unit, means cooperable between said units for raising and lowering said upper unit, a collapsible supporting element connected to one unit and positionable to engage said other unit to provide additional support for said upper unit when raised, a first hood section formed as a boxlike enclosure disposed longitudinally of and carried by said upper unit main frame and including at one end thereof a generally upright translucent screen and at the other end thereof an open frame, means on said upper unit main frame for supporting a projector of motion pictures or the like adjacent said open frame for the projection of images to the inner face of said screen, a second hood section including a second open frame at the outer face of said screen having laterally adjustable frame members providing for enlargement or reduction of said second open frame, means including telescopic connections between said second open frame and said first hood section for mounting said second open frame for movement longitudinally toward and away from said screen, and means included in said second hood section forming a flexible, boxlike enclosure between said screen and said second open frame.

5. Portable apparatus for use with a projector for the showing of motion pictures or the like, comprising a base unit, rolling ground supports normally positioned to carry said base unit in transport, means mounting said supports for removal from at least total weight-carrying position, means on said base unit forming vertical guide structure, an upper unit, means on said upper unit cooperating with said guide structure for mounting said upper unit for vertical adjustment with respect to said base unit, means cooperable between said units for raising and lowering said upper unit, a collapsible support connected to one unit and engageable with the other unit to provide additional support for said upper unit when said upper unit is raised, a generally upright translucent screen on the upper unit, means on said upper unit behind the rear face of said screen for supporting a projector of motion pictures or the like, means positionable between said screen and the projector for correcting the image projected by the projector to the rear face of said screen so that the image may be correctly observed by an observer viewing the front face of said screen, a first hood means positionable between the projector and said screen, means positioned at the front face of said screen including an adjustable open frame through which the front face of said screen may be observed, means mounting said open frame for adjustment toward and away from the front face of said screen, means on said open frame providing for enlargement or reduction thereof to vary the size of the opening through which said screen may be observed, second hood means disposed between said screen and said open frame, and means within said second hood means at the front face of said screen arranged for protective positioning over said screen.

6. Portable apparatus for use with a projector for the showing of motion pictures or the like, comprising a base unit, rolling ground supports positioned to carry said base unit in transport, an upper unit, means between said units mounting said upper unit for vertical adjustment with respect to said base unit, means cooperable between said units for raising and lowering said upper unit, a generally upright translucent screen on said upper unit, means on said upper unit behind the rear face of said screen for supporting a projector of motion pictures or the like so that an image may be projected by the projector to the rear face of said screen and be observed by an observer viewing the front face of said screen, a first hood means positionable between the projector and said screen, means positioned at the front face of said screen including an adjustable open frame through which the front face of said screen may be observed, means mounting said open frame for adjustment toward and away from the front face of said screen, means on said open frame providing for enlargement or reduction thereof to vary the size of the opening through which said screen may be observed, and second hood means disposed between said screen and said frame.

7. Portable apparatus for use with a projector for the showing of motion pictures or the like, comprising a base unit, rolling ground supports positioned to carry said base unit in transport, an upper unit, means between said units mounting said upper unit for vertical adjustment with respect to said base unit, means cooperable between said units for raising and lowering said upper unit, a collapsible support connected to one unit and engageable with the other unit to provide additional support for said upper unit when said upper unit is raised, a generally upright translucent screen on the upper unit, means on said upper unit behind the rear face of said screen for supporting a projector of motion pictures or the like so that an image may be projected by the projector to the rear face of said screen and observed by observers viewing the front face of said screen, means positioned at the front face of said screen including an open frame through which the front face of said screen may be observed, means mounting said open frame for movement toward and away from the front face of said screen, and second hood means disposed between said screen and said open frame.

8. Portable apparatus for use with a projector for the showing of motion pictures or the like, comprising a base unit, rolling ground supports normally positioned to carry said base unit in transport, means mounting said supports for removal from at least total weight-carrying position, means on said base unit forming vertical guide structure, an upper unit, means on said upper unit cooperating with said guide structure for mounting said upper unit for vertical adjustment with respect to said base unit, means cooperable between said units for raising and lowering said upper unit, a generally upright translucent screen on said upper unit, means on said upper unit behind the rear face of said screen for supporting a projector of motion pictures or the like, means positionable between said screen and the projector for correcting the image projected by the projector to the rear face of said screen so that the image may be correctly observed by observers viewing the front face of said screen, a first hood means positionable between the projector and said screen, means positioned at the front face of said screen including an open frame through which the front face of said screen may be observed, means mounting said open frame for movement toward and away from the front face of said screen, a second hood means disposed between said screen and said open frame, and means within said second hood means at the front face of said screen arranged for protective positioning over said screen.

9. Portable apparatus for use with a projector for the showing of motion pictures or the like, comprising a base unit, rolling ground supports positioned to carry said base unit in transport, an upper unit, means between said units mounting said upper unit for vertical adjustment with respect to said base unit, means cooperable between said units for raising and lowering said upper unit, a generally upright translucent screen on said upper unit, means on said upper unit behind the rear face of said screen for supporting a projector of motion pictures or the like so that an image may be projected by the projector to the rear face of said screen and observed by an observer viewing the front face of said screen, means positioned at the front face of said screen including an adjustable open frame through which the front face of said screen may be observed, means on said open frame providing for enlargement or reduction thereof to vary the size of the opening through which said screen may be observed, and second hood means disposed between said screen and said open frame.

WENDELL M. LEHMAN.
WILBUR C. RACHELS.

REFERENCES CITED

The following references are of record in the file of this patent:

UNITED STATES PATENTS

| Number | Name | Date |
|---|---|---|
| 994,276 | Reilly | June 6, 1911 |
| 1,082,914 | Sears et al. | Dec. 30, 1913 |
| 1,208,462 | Boernstein | Dec. 12, 1916 |
| 1,372,017 | Grant et al. | Mar. 22, 1921 |
| 1,433,877 | Exton | Oct. 31, 1922 |
| 1,460,600 | Palmer | July 3, 1923 |
| 1,746,607 | Readeker | Feb. 11, 1930 |
| 2,150,992 | Scott | Mar. 21, 1939 |
| 2,291,931 | Troeger | Aug. 4, 1942 |